United States Patent [19]
Volk

[11] Patent Number: 5,380,241
[45] Date of Patent: Jan. 10, 1995

[54] POULTRY HOCK TRUSS

[75] Inventor: Daniel J. Volk, Alpharetta

[73] Assignee: Volk Enterprises, Inc., Turlock, Calif.

[21] Appl. No.: 183,982

[22] Filed: Jan. 18, 1994

Related U.S. Application Data

[63] Continuation-in-part of Ser. No. 1,095, Jan. 6, 1993, Pat. No. 5,279,519.

[51] Int. Cl.6 .................................................. A22C 21/00
[52] U.S. Cl. ................................... 452/174; 452/176
[58] Field of Search ................................. 452/174, 176

[56] References Cited

U.S. PATENT DOCUMENTS

| | | | |
|---|---|---|---|
| 3,112,515 | 12/1963 | Volk et al. | 452/174 |
| 3,895,415 | 7/1975 | Volk | 452/174 |
| 4,051,573 | 10/1977 | Volk | 452/174 |
| 4,056,865 | 11/1977 | Cloyd | 452/174 |
| 4,293,977 | 10/1981 | Volk et al. | 452/174 |
| 4,518,083 | 5/1985 | Mayer, Jr. | 452/174 |
| 4,625,075 | 10/1986 | Volk | 452/174 |
| 4,653,146 | 3/1987 | Volk | 452/174 |
| 4,739,538 | 4/1988 | Volk | 452/174 |
| 4,771,509 | 9/1988 | Volk | 452/174 |
| 5,279,519 | 1/1994 | Volk | 452/174 |

Primary Examiner—Willis Little
Attorney, Agent, or Firm—Julian Caplan

[57] ABSTRACT

A poultry hock truss for use with a body of eviscerated poultry having hocks and comprising a unitary substantially coplanar thin plastic member. The plastic member includes an anchor element adapted for attachment to the body of eviscerated poultry. A pair of side portions extend upwardly and outwardly from the anchor element and terminate in inwardly curved upper ends. An upper transverse crosspiece joins the inwardly curved upper ends of the side portions and a tab portion depends approximately from the midpoint of the upper transverse crosspiece toward the anchor element. The upper transverse crosspiece, the tab portion, the side portions and the anchor element define a generally heart-shaped opening with first and second juxtaposed lobes. The lobes of the heart-shaped opening are formed to hold the hocks together in juxtaposition.

13 Claims, 1 Drawing Sheet

POULTRY HOCK TRUSS

This application is a continuation-in-part of application Ser. No. 08/001,095 filed Jan. 6, 1993. Now U.S. Pat. No. 5,279,519.

BACKGROUND OF THE INVENTION

1. Field of the Invention

This invention relates in general to a new and improved poultry hock retainer or truss for poultry or fowl and pertains, more specifically, to a truss for holding together the hocks of the small fowl during processing, transportation, storage and cooking.

2. Prior Art

Plastic retainers have been provided for retaining the hocks of turkey and other fowl during processing and shipping and for facilitating ease of inspection of the eviscerated fowl. Some of these retainers are secured inside the fowl by oppositely extending hooks which engage the kidney cavities in the fowl and have bridles or similar apparatus for retaining the hocks in the desired position. See, for example, U.S. Pat. Nos. 4,615,075, 4,653,146, 4,739,538 and 4,771,509 issued to Volk which each show a unitary beam member and bridle. Upstanding loops or tabs have been provided on the beam member for facilitating insertion of the retainer into the carcass, as shown in U.S. Pat. Nos. 4,653,146, 4,739,538 and 4,771,509, and depending tabs have been provided as part of the bridle for securing it to the hocks, as disclosed in U.S. Pat. No. 4,771,509. Although desirable in many respects, these retainers are not readily suitable for use on smaller poultry such as chicken, which are considerably less rigid than turkey carcasses, and are not easily packagable for shipping and storage.

Accordingly, a primary object of the present invention is to provide a new and improved poultry hock truss which overcomes the disadvantages and limitations of the retainers currently provided.

Another object of the invention is to provide a poultry hock truss of the above character which is suitable for use with small poultry such as chicken.

Another object of the invention is to provide a poultry hock truss of the above character which can be easily nested along a runner.

SUMMARY OF THE INVENTION

In general, the invention consists of a poultry hock truss for use with a body of eviscerated poultry having hocks and comprising a unitary substantially coplanar thin plastic member. The plastic member includes anchor means adapted for attachment to the body of eviscerated poultry. A pair of side portions extend upwardly and outwardly from the anchor means and terminate in inwardly curved upper ends. An upper transverse crosspiece joins the inwardly curved upper ends of the side portions and a tab portion depends approximately from the midpoint of the upper transverse crosspiece toward the anchor means. The upper transverse crosspiece, the tab portion, the side portions and the anchor means define a generally heart-shaped opening with first and second juxtaposed lobes. The lobes of the heart-shaped opening are formed to hold the hocks together in juxtaposition.

BRIEF DESCRIPTION OF THE DRAWINGS

The accompanying drawings, which are incorporated in and form a part of this specification, illustrate an embodiment of the invention and, together with the description, serve to explain the principles of the invention.

DETAILED DESCRIPTION OF THE PREFERRED EMBODIMENTS

Reference will now be made in detail to the preferred embodiment of the invention, an example of which is illustrated in the accompanying drawings. While the invention will be described in conjunction with the preferred embodiment, it will be understood that the invention is not limited to this embodiment. On the contrary, the invention is intended to cover alternatives, modifications and equivalents, which may be included within the spirit and scope of the invention as defined by the appended claims.

Figures 1, 2:
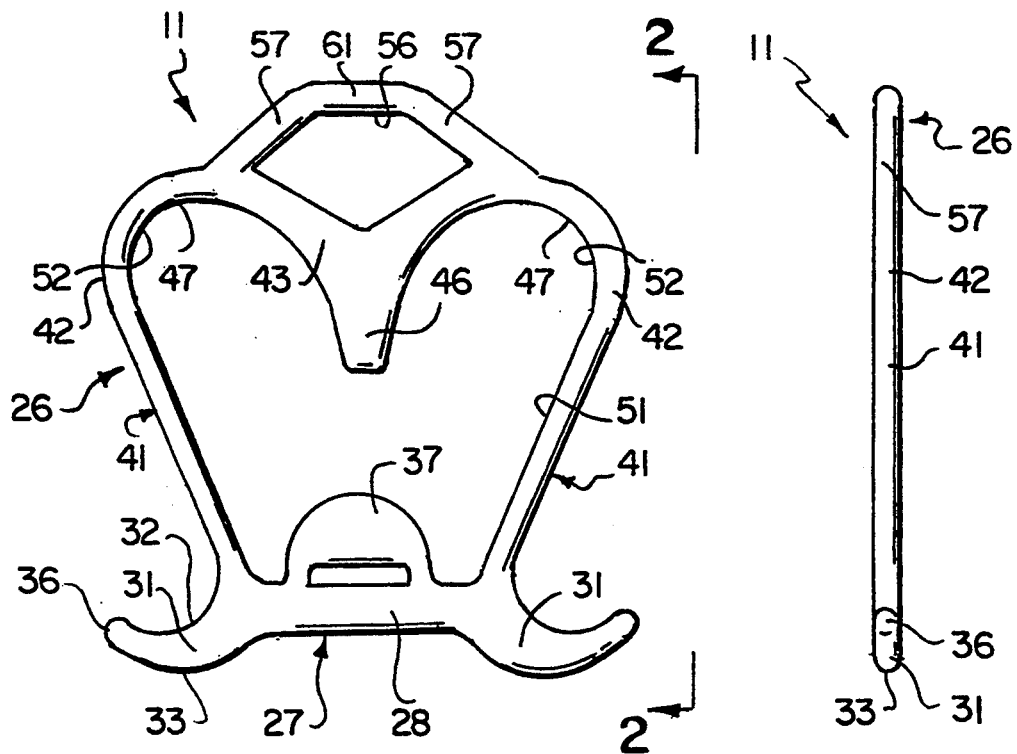
FIG. 1 is top plan view of the poultry hock truss of the present invention.
FIG. 2 is an end elevational view taken along the line 2—2 of FIG. 1.
Figure 3:
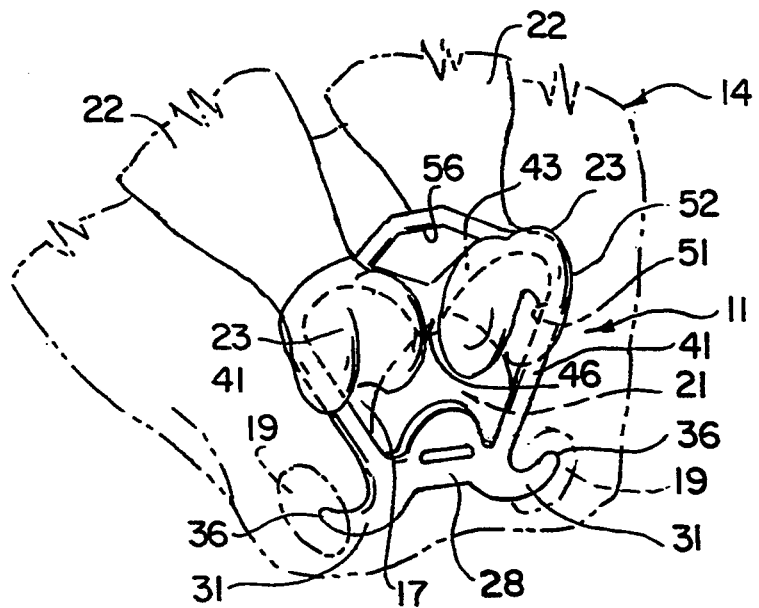
FIG. 3 is a perspective view of the poultry hock truss of the present invention in position on poultry.

Turning now to the drawings, wherein like components are designated by like reference numerals throughout the various figures, attention is directed to FIGS. 1 through 3 where one embodiment of the invention is illustrated.

Poultry hock retainer or truss 11 of the present invention is for use with a body or carcass 14 of a poultry such as a chicken which has been eviscerated so as to have a rear opening 17 for accessing a cavity within the carcass (see FIG. 3). At least a portion of the bone structure of carcass 14 is exposed within cavity and includes kidney openings 19. Carcass 14 further includes a tail 21 and legs 22 having exposed knuckles or hocks 23.

Truss 11 is made from a unitary thin member 26 formed from any suitable material such as plastic and preferably injection molded out of nylon. Member 26 is substantially coplanar, as illustrated in FIG. 2, and has an anchor means or element 27 adapted for attachment within the cavity of eviscerated carcass 14. Anchor element 27 includes a lower transverse crosspiece 28 having opposite ends formed as outwardly extending hooks 31 for engaging carcass 14. Hooks 31 curve outwardly and downwardly and are defined by upper and lower curved edges 32 and 33 which terminate at a rounded point 36 formed sharp enough to engage kidney openings 19 when anchor element 27 is installed within carcass 14. Lower transverse crosspiece 28 is formed with a relatively solid and hence relatively rigid upstanding tab portion or gripping tab 37. It should be understood that anchor element 27 can have other configurations and be within the scope of the present invention.

Poultry hock truss 11 has an upper portion which secures hocks 23 relatively close to carcass 14 and is generally symmetrical with respect to a line extending perpendicularly upwardly from the midpoint of lower transverse crosspiece 28. In this regard, a pair of side portions for sides 41 extend upwardly and outwardly from lower transverse crosspiece 28 at an angle ranging from approximately 50° to 80°, and preferably approximately 70°, from crosspiece 28. Outwardly slanted sides 41 terminate in upper ends 42 which curve inwardly toward each other. An upper transverse crosspiece 43 is joined at its ends to upper ends 42 of sides 41 and extends between sides 41. A positioning tab portion or tab 46 depends approximately from the midpoint of upper transverse crosspiece 43 and extends downwardly toward anchor element 27 to a point approximately half the distance between the upper transverse crosspiece and lower transverse crosspiece 28. Upper ends 42 of sides 41, upper transverse crosspiece 43 and depending tab 46 define and form a pair of U-shaped edges 47 which open downwardly toward anchor element 27. Edges 47 each subtend an angle of approximately 180° when viewed in plan as illustrated in FIG. 1.

A generally heart-shaped central opening 51 is defined by upper transverse crosspiece 43, depending tab 46, sides 41 and lower transverse crosspiece 43 of anchor element 27. Central opening 51 includes first and second juxtaposed rounded lobes 52 which are defined in part by U-shaped edges 47. The central opening, including lobes 52 thereof, is generally unobstructed except for gripping tab 37 which extends upwardly from lower transverse crosspiece 28 into the central opening.

Poultry hock truss 11 includes a second or upper opening 56 which is located above central opening 51 and upper transverse crosspiece 53. Means for defining upper opening 56 includes the upper transverse crosspiece and a pair of second or additional side portions or sides 57 which extend from the ends of the upper transverse crosspiece, adjacent upper ends 42, toward each other in an upward and inward direction. Inwardly slanted additional sides 57 are connected by a transverse central portion 61 which extends between the additional sides and further defines upper opening 56. As illustrated in FIG. 1, upper opening 56 has the form of a diamond-shaped pentagon.

Member 26 of poultry hock truss 11 is relatively rigid except for sides 41 which are relatively flexible so as to permit some relative movement between the plane of upper transverse crosspieces 43 and depending tab 46 and the plane of anchor element 27. In the embodiment illustrated, sides 41 are made flexible by forming them thinner in cross section than the balance of unitary member 26. It should be appreciated, however, that member 26, including sides 41, could be relatively rigid and be within the scope of the present invention.

In operation and use, poultry hock truss 11 is used for holding hocks 23 of an eviscerated chicken together in juxtaposition and relatively close to carcass 14 (see FIG. 3). Preparatory to attaching truss 11 to carcass 14, it will be understood that useable chicken parts, such as giblets, may be inserted into the cavity of the chicken through rear opening 17 and further that the consumer may insert stuffing through the rear opening. The truss of the present invention is attached to carcass 14 by inserting hooks 31 through opening 17 so that rounded points 36 of the hooks fit into kidney openings 19. Tab 37 can be gripped by the consumer to facilitate the insertion of hooks 31 into the kidney openings. The opposite surfaces of tab 37 can be smooth or rough for facilitating gripping with or without gloves.

The upper portion of truss 11 can be rapidly mounted about hocks 23 for holding the chicken legs and hocks against carcass 14. In this regard, central opening 51 is sufficiently large so that hocks 23 may be readily inserted therethrough. Once the hocks extend through the central opening of truss 11, they are pushed upwardly into respective lobes 52 of the central opening. The rounded contour of U-shaped edges 47 generally approximates the circumferential shape of the hocks and causes relatively snug disposition of the hocks between depending tab 46 and sides 41 of plastic member 26. Edges 47 cut into the tendons of legs 22 behind hocks 23 to enhance attachment of the truss to the legs. Depending tab 46 is adapted to fit behind hocks 23 so as to act as a lever and exert an outward pressure on and ensure an even truss of the hocks.

The flexibility of sides 41 relative to the balance of member 26 permits movement of trussed hocks 23 during processing or handling of carcass 14 without causing hooks 31 of lower transverse crosspiece 28 to dislodge from kidney openings 19. In this regard, flexible sides 41 serve to reduce transference of the movement of the relatively rigid plane of upper transverse crosspiece 43 and depending tab 46, due to the shifting of hocks 23 or otherwise, to the relatively rigid plane of anchor element 27.

Poultry tail 21 can be conveniently stored within central opening 51. After placing hocks 23 within lobes 52 of the central opening, tail 21 can be tucked inside the central opening. Depending tab 46 serves the additional function of engaging the poultry tail and holding it in place.

Upper opening 56 of poultry hock truss 11 serves several important functions. During the storage of trusses 51 and the mounting of the trusses to poultry carcasses, the upper opening facilitates the nesting of a plurality of trusses 11 on a cardboard or other suitable runner. Upper opening 56 is also a convenient means for attachment of price tags, inspection data and cooking instructions. In addition, with the development of automatic trussing equipment, upper opening 56 provides a convenient means for gripping truss 11 during its installation. Further, the upper opening is a handy means for gripping poultry carcass 14 after truss 11 has been anchored into the carcass.

It is apparent from the foregoing that a new and improved poultry hock truss has been provided which overcomes the disadvantages and limitations of poultry retainers currently available. The truss is suitable for use with small poultry such as chicken and can be easily nested along a runner.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, and to thereby enable others skilled in the art to best utilize the invention and various embodiments with various modifications as are suited to the particular use contemplated. It is intended that the scope of the invention be defined by the claims appended hereto and their equivalents.

What is claimed is:

1. A poultry hock truss for use with a body of eviscerated poultry having hocks comprising a unitary substantially coplanar thin plastic member, the plastic member including anchor means adapted for attachment to the body of eviscerated poultry, a pair of side portions extending upwardly and outwardly from the anchor means and terminating in inwardly curved upper ends, an upper transverse crosspiece joining the inwardly curved upper ends of the side portions and a tab portion depending approximately from the midpoint of the upper transverse crosspiece toward the anchor means, the upper transverse crosspiece, the tab portion, the side portions and the anchor means defining a generally heart-shaped opening with first and second juxtaposed lobes, the lobes of the heart-shaped opening being formed to hold the hocks together in juxtaposition.

2. A poultry hock truss as in claim 1 wherein the lobes of the heart-shaped opening are unobstructed.

3. A poultry hock truss as in claim 1 wherein the inwardly curved upper ends of the side portions, the upper transverse crosspiece and the tab portion form a pair of U-shaped edges for disposition behind the hocks.

4. A poultry hock truss as in claim 1 wherein the tab portion depends to a point approximately half the distance between the upper transverse crosspiece and the anchor means.

5. A poultry hock truss as in claim 1 wherein the anchor means includes a lower transverse crosspiece having opposite ends formed as outwardly extending hooks for engaging the body of eviscerated poultry.

6. A poultry hock truss as in claim 5 wherein the lower transverse crosspiece is formed with an upstanding additional tab portion for facilitating attachment of the anchor means to the body of eviscerated poultry.

7. A poultry hock truss as in claim 1 further comprising means for defining a second opening over the upper transverse crosspiece.

8. A poultry hock truss as in claim 7 wherein the means for defining the second opening includes a pair of inwardly and upwardly extending additional side portions joined by a transverse central portion.

9. A poultry hock truss as in claim 7 wherein the second opening has the form of a diamond-shaped pentagon.

10. A poultry hock truss as in claim 1 wherein the side portions are flexible relative to the anchor means and the upper transverse crosspiece.

11. A poultry hock truss for use with a body of eviscerated poultry having hocks comprising a unitary substantially coplanar thin plastic member, the plastic member including a lower transverse crosspiece having opposite ends formed as outwardly extending hooks adapted for engaging the body of eviscerated poultry, a pair of side portions extending upwardly from the lower transverse crosspiece and terminating in upper ends and an upper transverse crosspiece joining the upper ends of the side portions, the upper ends of the side portions and the upper transverse crosspiece forming a pair of U-shaped edges which open downwardly and each subtend an angle of approximately 180° whereby the U-shaped edges of the plastic member engage and hold the hocks together in juxtaposition.

12. A poultry hock truss as in claim 11 wherein the plastic member further includes a pair of additional side portions which extend inwardly and upwardly from the upper transverse crosspiece and are joined by a transverse central portion.

13. A poultry hock truss as in claim 12 wherein the upper transverse crosspiece, the additional side portions and the transverse central portion define an opening having the form of a diamond-shaped pentagon.

* * * * *